US012716739B2

(12) United States Patent
Austin et al.

(10) Patent No.: US 12,716,739 B2
(45) Date of Patent: Aug. 25, 2026

(54) USING A LIGHT OF A PARKED VEHICLE TO ILLUMINATE A PATH

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); William Patrick Garrett, Plymouth, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 102 days.

(21) Appl. No.: 18/530,538

(22) Filed: Dec. 6, 2023

(65) Prior Publication Data

US 2025/0189335 A1 Jun. 12, 2025

(51) Int. Cl.
*G01C 21/36* (2006.01)
*B60Q 1/50* (2006.01)

(52) U.S. Cl.
CPC .......... *G01C 21/3661* (2013.01); *B60Q 1/50* (2013.01)

(58) Field of Classification Search
CPC .................................................. G01C 21/3661
See application file for complete search history.

(56) References Cited

U.S. PATENT DOCUMENTS 7,759,819 B2 7/2010 Michiyama et al.
9,646,480 B2 5/2017 Fadell et al.
9,689,542 B2 6/2017 Anderson et al.
10,514,264 B2 12/2019 Correnti et al.
11,155,205 B2 * 10/2021 Pandit ...................... B60Q 1/26
2007/0222574 A1 9/2007 Courts
2018/0135989 A1 * 5/2018 Schreier ............... G01C 21/343
(Continued)

FOREIGN PATENT DOCUMENTS

DE 102015011212 A1 * 3/2016 ............ B60Q 1/525
DE 102023202502 A1 * 9/2024
(Continued)

OTHER PUBLICATIONS

Google Machine Translation of DE102023202502A1 (2023).*
(Continued)

*Primary Examiner* — Jean Paul Cass

(74) *Attorney, Agent, or Firm* — Christopher G. Darrow; Darrow Mustafa PC

(57) ABSTRACT

A system for using a light of a parked vehicle to illuminate a path can include a processor and a memory. The memory can store a location determination module, a path determination module, a safety evaluation module, and a communications module. The location determination module can determine a location of an individual and a location of a vehicle associated with the individual. The path determination module can determine one or more paths from the location of the individual to the location of the vehicle. The safety evaluation module can determine a path, of the one or more paths, based at least in part on a measurement of a safety criterion. The communications module can cause a light of a parked vehicle to illuminate the path. The parked vehicle can be different from the vehicle.

20 Claims, 6 Drawing Sheets

(56) References Cited

U.S. PATENT DOCUMENTS

| | | | | |
|---|---|---|---|---|
| 2019/0020735 | A1* | 1/2019 | Joo | H04H 20/72 |
| 2021/0191404 | A1 | 6/2021 | Blake et al. | |
| 2022/0148427 | A1* | 5/2022 | Emadi | G08G 1/146 |
| 2023/0415764 | A1* | 12/2023 | Cserna | B60Q 1/507 |

FOREIGN PATENT DOCUMENTS

| | | | |
|---|---|---|---|
| EP | 3531391 | A1 | 8/2019 |
| JP | 2002120643 | A | 4/2002 |

OTHER PUBLICATIONS

Google Machine Translation of DE102015011212A1 (2014).*

Rea et al., "Parking Lot Lighting Based Upon Predictions of Scene Brightness and Personal Safety," Lighting Research & Technology, vol. 0, pp. 1-12, Jul. 9, 2015.

Raquel Rutledge, "'The building code doesn't assume that a bad guy is there': Confusion over codes keepsparking garage lights dim," Milwaukee Journal Sentinel, Sep. 23, 2020, found at https://www.jsonline.com/story/news/investigations/reports/2020/09/23/confusion-over-building-codes-keeps-hospital-parking-garage-lights-dim/3493913001/#:~:text='The%20building%20code%20doesn't,keeps%20parking%20garage%20lights%20dim&text=Dimly%20lit%20parking%20garages%20are,dangers%20that%20come%20with%20it.

"The Difference Between 'Trip' vs 'Slip' and Fall Accidents," found at https://sobolaw.com/premises-liability/the-difference-between-trip-vs-slip-and-fall-accidents/.

* cited by examiner

USING A LIGHT OF A PARKED VEHICLE TO ILLUMINATE A PATH

TECHNICAL FIELD

The disclosed technologies are directed to using a light of a parked vehicle to illuminate a path.

BACKGROUND

In general, international building code guidelines do not specify lighting requirements for parking facilities (e.g., parking garages, parking lots, etc.). Consequently, many parking facilities may be dimly lit or may have no lighting. A lack of adequate lighting can not only allow such parking facilities to be sites of criminal activities, but can also obscure an ability of an individual to perceive a hazard or an obstacle. Such a condition can contribute to an occurrence in which the individual incurs a personal injury or property damage from a slip, a trip, or a fall resulting from an encounter with such a hazard or an obstacle.

SUMMARY

In an embodiment, a system for using a light of a parked vehicle to illuminate a path can include a processor and a memory. The memory can store a location determination module, a path determination module, a safety evaluation module, and a communications module. The location determination module can include instructions that, when executed by the processor, cause the processor to determine a location of an individual and a location of a vehicle associated with the individual. The path determination module can include instructions that, when executed by the processor, cause the processor to determine one or more paths from the location of the individual to the location of the vehicle. The safety evaluation module can include instructions that, when executed by the processor, cause the processor to determine a path, of the one or more paths, based at least in part on a measurement of a safety criterion. The communications module can include instructions that, when executed by the processor, cause the processor to cause a light of a parked vehicle to illuminate the path. The parked vehicle can be different from the vehicle.

In another embodiment, a method for using a light of a parked vehicle to illuminate a path can include determining, by a processor, a location of an individual and a location of a vehicle associated with the individual. The method can include determining, by the processor, one or more paths from the location of the individual to the location of the vehicle. The method can include determining, by the processor, the path, of the one or more paths, based at least in part on a measurement of a safety criterion. The method can include causing, by the processor, the light of the parked vehicle to illuminate the path. The parked vehicle can be different from the vehicle.

In another embodiment, a non-transitory computer-readable medium for using a light of a parked vehicle to illuminate a path can include instructions that, when executed by one or more processors, cause the one or more processors to determine a location of an individual and a location of a vehicle associated with the individual. The non-transitory computer-readable medium can include instructions that, when executed by the one or more processors, cause the one or more processors to determine one or more paths from the location of the individual to the location of the vehicle. The non-transitory computer-readable medium can include instructions that, when executed by the one or more processors, cause the one or more processors to determine a path, of the one or more paths, based at least in part on a value of a measurement of a safety criterion. The non-transitory computer-readable medium can include instructions that, when executed by the one or more processors, cause the one or more processors to cause a light of a parked vehicle to illuminate the path. The parked vehicle can be different from the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 2A through 2C include diagrams that illustrate an example of a vehicle having a light that can be used to illuminate a path, according to the disclosed technologies.

DETAILED DESCRIPTION

The disclosed technologies can use a light of a parked vehicle to illuminate a path. A location of an individual and a location of a vehicle associated with the individual can be determined. One or more paths from the location of the individual to the location of the vehicle can be determined. For example, an ability of the parked vehicle to illuminate the path, of the one or more paths, can be determined. For example, the ability of the parked vehicle to illuminate the path can be a function of information associated with the parked vehicle. For example, the information can be one or more of: (1) a location of the parked vehicle, (2) a model of the parked vehicle, (3) a body style of the parked vehicle, (4) a trim level of the parked vehicle, (5) information about the light of the parked vehicle, or (6) the like. The path can be determined based at least in part on a measurement of a safety criterion. For example, the safety criterion can be with respect to an aspect of the path or the individual. For example, the aspect can be one or more of: (1) one or more of a characteristic or a condition of a road surface along the path or (2) one or more of a characteristic or a condition of the individual. For example, the aspect can be determined. For example, the aspect can be determined based on information from one or more of: (1) a sensor or (2) a communications device. For example, the aspect can be determined using an object recognition technique. For example, the object recognition technique can be one or more of: (1) a posture detection technique or (2) a posture recognition technique. The light of the parked vehicle can be caused to illuminate the path. The parked vehicle can be different from the vehicle. For example, the parked vehicle can include a plurality of parked vehicles and the ability of each of the plurality of parked vehicles to illuminate a corresponding segment of the path can be determined. For example, the path can include a plurality of paths and: (1) a first of the plurality of vehicles can be caused to illuminate a first path of the plurality of paths and (2) a second of the plurality of vehicles can be caused to illuminate a second path of the plurality of paths.

Advantageously, the disclosed technologies can be used not only in an unlit or dimly lit parking garage or parking lot, but also in a parking lot at night or during an overcast day or even during daylight (e.g., using high intensity lights).

Advantageously, the disclosed technologies can provide a method for the individual to find the vehicle associated with the individual, specifically in a situation of one or more of a location of the vehicle associated with the individual being outside of a line of sight of the individual or the individual being unable to recall the location of the vehicle associated with the individual.

Figure 1:
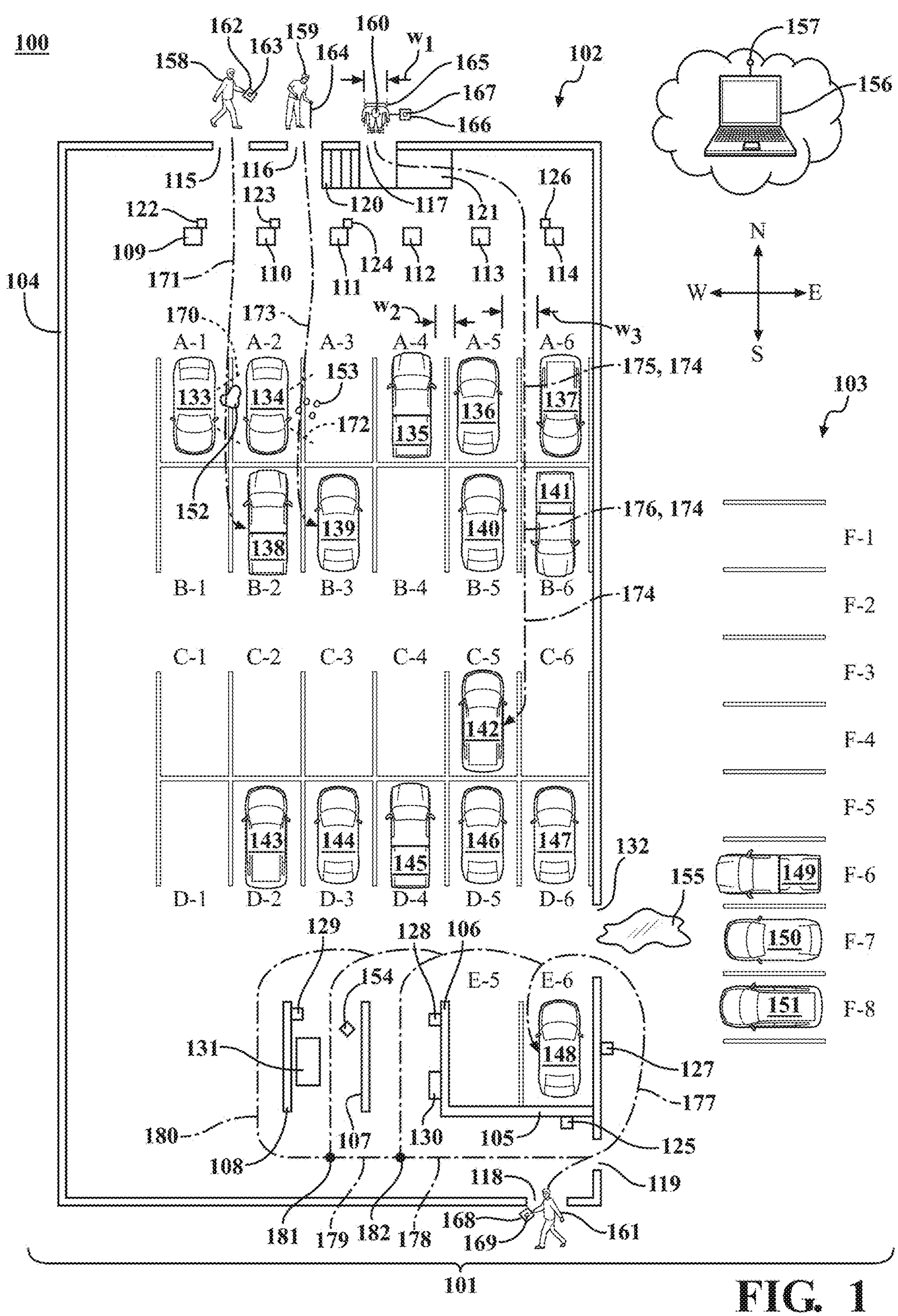
FIG. 1 includes a diagram that illustrates an example of an environment for using a light of a parked vehicle to illuminate a path, according to the disclosed technologies.

FIG. 1 includes a diagram that illustrates an example of an environment 100 for using a light of a parked vehicle to illuminate a path, according to the disclosed technologies. For example, the environment 100 can include a parking facility 101. For example, the parking facility 101 can include a parking garage 102 and a parking lot 103. For example, the parking lot 103 can be located east of the parking garage 102. For example, the parking garage 102 can include twenty-six parking spaces in five rows. From north to south, the five rows can include, for example, a row A, a row B, a row C, a row D, and a row E. From west to east, the row A can include, for example, a parking space A-1, a parking space A-2, a parking space A-3, a parking space A-4, a parking space A-5, and a parking space A-6. From west to east, the row B can include, for example, a parking space B-1, a parking space B-2, a parking space B-3, a parking space B-4, a parking space B-5, and a parking space B-6. From west to east, the row C can include, for example, a parking space C-1, a parking space C-2, a parking space C-3, a parking space C-4, a parking space C-5, and a parking space C-6. From west to east, the row D can include, for example, a parking space D-1, a parking space D-2, a parking space D-3, a parking space D-4, a parking space D-5, and a parking space D-6. From west to east, the row E can include, for example, a parking space E-5 and a parking space E-6. For example, the parking lot 103 can include eight parking spaces in a row. From north to south, the parking lot 103 can include, for example, a row F. From north to south, the row F can include, for example, a parking space F-1, a parking space F-2, a parking space F-3, a parking space F-4, a parking space F-5, a parking space F-6, a parking space F-7, and a parking space F-8.

For example, the parking garage 102 can have a perimeter wall 104, a first interior wall 105, a second interior wall 106, a third interior wall 107, and a fourth interior wall 108. For example, the first interior wall 105 can be located along a latitude in a southeast portion of the parking garage 102, south of the row E. For example, the second interior wall 106 can be located along a longitude west of parking space E-5 and form a corner with the first interior wall 105. For example, the third interior wall 107 can be located along a longitude in the row E south of a boundary between the parking space D-3 and the parking space D-4. For example, the fourth interior wall 108 can be located along a longitude in the row E south of a boundary between the parking space D-2 and the parking space D-3.

For example, the parking garage 102 can have six columns. For example, a first column 109 can be located north of the parking space A-1. For example, a second column 110 can be located north of the parking space A-2. For example, a third column 111 can be located north of the parking space A-3. For example, a fourth column 112 can be located north of the parking space A-4. For example, a fifth column 113 can be located north of the parking space A-5. For example, a sixth column 114 can be located north of the parking space A-6.

For example, the perimeter wall 104 can have five doors. For example, a first door 115 can be located north of a boundary between the parking space A-1 and the parking space A-2. For example, a second door 116 can be located north of a boundary between the parking space A-2 and the parking space A-3. For example, a third door 117 can be located north of a boundary between the parking space A-3 and the parking space A-4. For example, a fourth door 118 can be located south of the first interior wall 105 and the parking space E-6. For example, a fifth door 119 can be located in the southeast portion of the perimeter wall 104 and can be configured to allow access between the parking garage 102 and the parking lot 103.

For example, a staircase 120 and a ramp 121 can be located south of the third door 117. For example, the staircase 120 can have steps that descend from east to west. For example, the ramp 121 can have a surface that descends from west to east.

For example: (1) a first camera 122 can be disposed on the first column 109, a second camera 123 can be disposed on the second column 110, (3) a third camera 124 can be disposed on the third column 111, and (4) a fourth camera 125 can be disposed on the first interior wall 105. For example, a communications device 126 can be disposed on the sixth column 114. For example, a temperature sensor 127 can be disposed on an exterior portion of the perimeter wall 104 near the fifth door 119. For example, a microphone 128 can be disposed on a western side of the second interior wall 106. For example, an electronic nose 129 can be disposed on an eastern side of the fourth interior wall 108. For example, speakers 130 can be disposed on the western side of the second interior wall 106. For example, a dumpster 131 can have been placed near the eastern side of the fourth interior wall 108. For example, the communications device 126 can be communicably coupled to one or more of the first camera 122, the second camera 123, the third camera 124, the fourth camera 125, the temperature sensor 127, the microphone 128, or the electronic nose 129.

For example, an accessway 132 between the parking garage 102 and the parking lot 103 can be located at an eastern portion of the perimeter wall 104 between the row D and the row E.

For example: (1) a first vehicle 133 can be parked in the parking space A-1, (2) a second vehicle 134 can be parked in the parking space A-2, (3) a third vehicle 135 can be parked in the parking space A-4, (4) a fourth vehicle 136 can be parked in the parking space A-5, (5) a fifth vehicle 137 can be parked in the parking space A-6, (6) a sixth vehicle 138 can be parked in the parking space B-2, (7) a seventh vehicle 139 can be parked in the parking space B-3, (8) an eighth vehicle 140 can be parked in the parking space B-5, (9) a ninth vehicle 141 can be parked in the parking space B-6, (10) a tenth vehicle 142 can be parked in the parking space C-5, (11) an eleventh vehicle 143 can be parked in the parking space D-2, (12) a twelfth vehicle 144 can be parked in the parking space D-3, (13) a thirteenth vehicle 145 can be parked in the parking space D-4, (14) a fourteenth vehicle 146 can be parked in the parking space D-5, (15) a fifteenth vehicle 147 can be parked in the parking space D-6, (16) a sixteenth vehicle 148 can be parked in the parking space E-6, (17) a seventeenth vehicle 149 can be parked in the parking space F-6, (18) an eighteenth vehicle 150 can be parked in the parking space F-7, and (19) a nineteenth vehicle 151 can be parked in the parking space F-8.

In the parking garage 102, for example: (1) a puddle 152 can exist on a surface between the parking space A-1 and the parking space A-2, (2) debris 153 can exist on a surface between the parking space A-2 and the parking space A-3, and (3) a box 154 can exist on a surface between the third interior wall 107 and the fourth interior wall 108. In the parking lot 103, for example, a patch of ice 155 can exist on a surface between the perimeter wall 104 and the parking space F-7.

For example, the environment 100 can also include a system 156 for using a light of a parked vehicle to illuminate a path. For example, the system 156 can include a communications device 157.

For example: (1) a first person 158 (e.g., Alice) can be entering the parking garage 102 through the first door 115, (2) a second person 159 (e.g., Bob) can be entering the parking garage 102 through the second door 116, (3) a third person 160 (e.g., Carol) can be entering the parking garage 102 through the third door 117, and (4) a fourth person 161 (e.g., Dave) can be entering the parking garage 102 through the fourth door 118. For example, the first person 158 (e.g., Alice) can have a communications device 162. For example, the communications device 162 can include a Global Navigation Satellite System (GNSS) device 163. For example, the second person 159 (e.g., Bob) can have a cane 164. For example, the third person 160 (e.g., Carol) can be sitting in a wheelchair 165 and can have a communications device 166. For example, the communications device 166 can include a GNSS device 167. For example, the fourth person 161 (e.g., Dave) can have a communications device 168. For example, the communications device 168 can include a GNSS device 169.

Figure 2B:
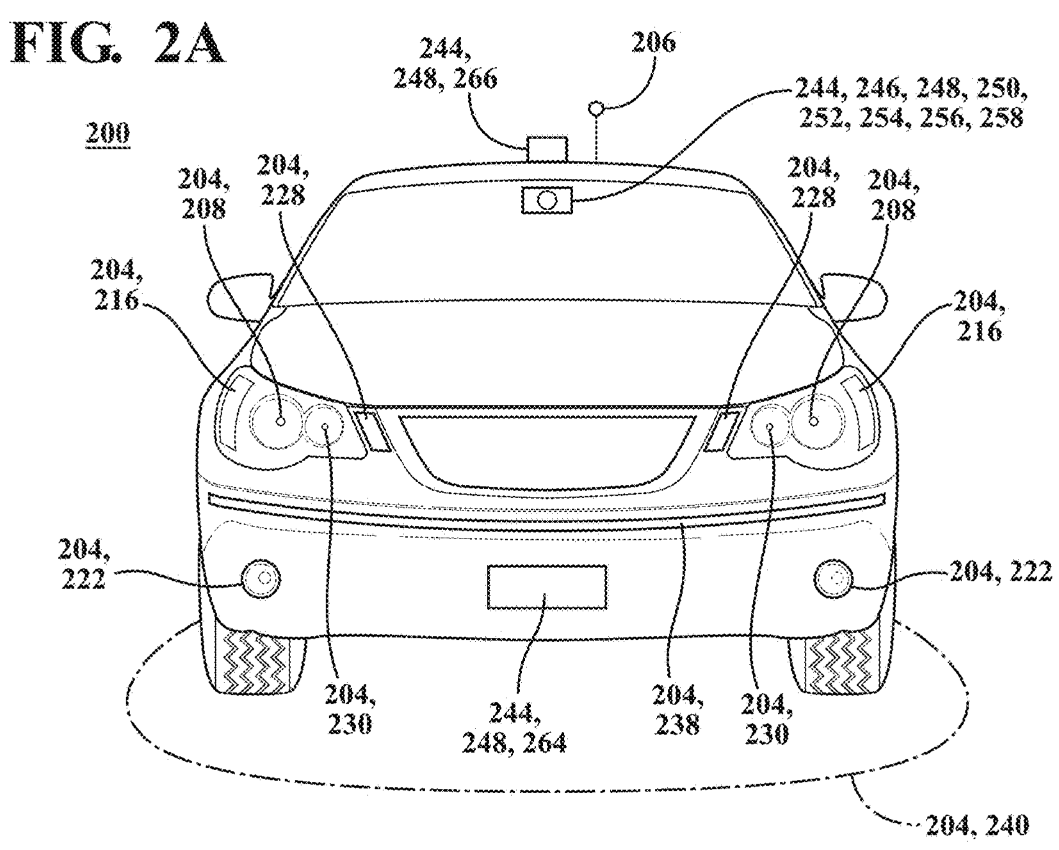

FIGS. 2A through 2C include diagrams that illustrate an example of a vehicle 200 having a light that can be used to illuminate a path, according to the disclosed technologies. FIG. 2A includes a diagram that illustrates an example of a front view of the vehicle 200. FIG. 2B includes a diagram that illustrates an example of a side view of the vehicle 200. FIG. 2C includes a diagram that illustrates an example of a rear view of the vehicle 200. As illustrated in FIGS. 2A-2C, the vehicle 200 can include multiple elements. One of skill in the art, in light of the description herein, understands that in various implementations the vehicle 200 may not include all of the elements illustrated in FIGS. 2A-2C. The vehicle 200 can have any combination of the various elements illustrated in FIGS. 2A-2C. Moreover, the vehicle 200 can have elements in addition to those illustrated in FIGS. 2A-2C. For example, one or more of: (1) the first vehicle 133, (2) the second vehicle 134, (3) the third vehicle 135, (4) the fourth vehicle 136, (5) the fifth vehicle 137, (6) the sixth vehicle 138, (7) the seventh vehicle 139, (8) the eighth vehicle 140, (9) the ninth vehicle 141, (10) the tenth vehicle 142, (11) the eleventh vehicle 143, (12) the twelfth vehicle 144, (13) the thirteenth vehicle 145, (14) the fourteenth vehicle 146, (15) the fifteenth vehicle 147, (16) the sixteenth vehicle 148, (17) the seventeenth vehicle 149, (18) the eighteenth vehicle 150, and (19) the nineteenth vehicle 151 can be the vehicle 200. The vehicle 200 can include, for example, an electronic control unit (ECU) 202, a light 204, and a communications device 206. The light 204 can be communicably coupled to the ECU 202. The communications device 206 can be communicably coupled to the ECU 202.

For example, the light 204 can include one or more of a headlight 208, a brake light 210, a center high mount stop light 212, a reversing light 214, a turn signal light 216, a side turn signal light 218, a mirror-mounted side turn signal light 220, a front fog light 222, a rear fog light 224, a cornering light 226, a front position (parking) light 228, a daytime running light 230, a side marker light 232, a rear registration plate light 234, a running board light 236, a perimeter light 238, an underglow light 240, or the like. For example, the mirror-mounted side turn signal light 220 can be disposed underneath a side rearview mirror 242 of the vehicle 200.

Additionally, for example, the vehicle 200 can include a sensor 244. The sensor 244 can be communicably coupled to the ECU 202. For example, the sensor 244 can include one or more of an imaging device 246 or a ranging device 248. For example, the one or more of the imaging device 246 or the ranging device 248 can include one or more of a camera 250, a color camera 252, a stereoscopic camera 254, a video camera 256, a digital video camera 258, an ultrasonic imaging device 260, an infrared imaging device 262, a radar device 264, a lidar device 266, an ultrasonic ranging device 268, an infrared ranging device 270, or the like.

Additionally, for example, the vehicle 200 can include a GNSS device 272. The GNSS device 272 can be communicably coupled to the ECU 202.

Figure 3:
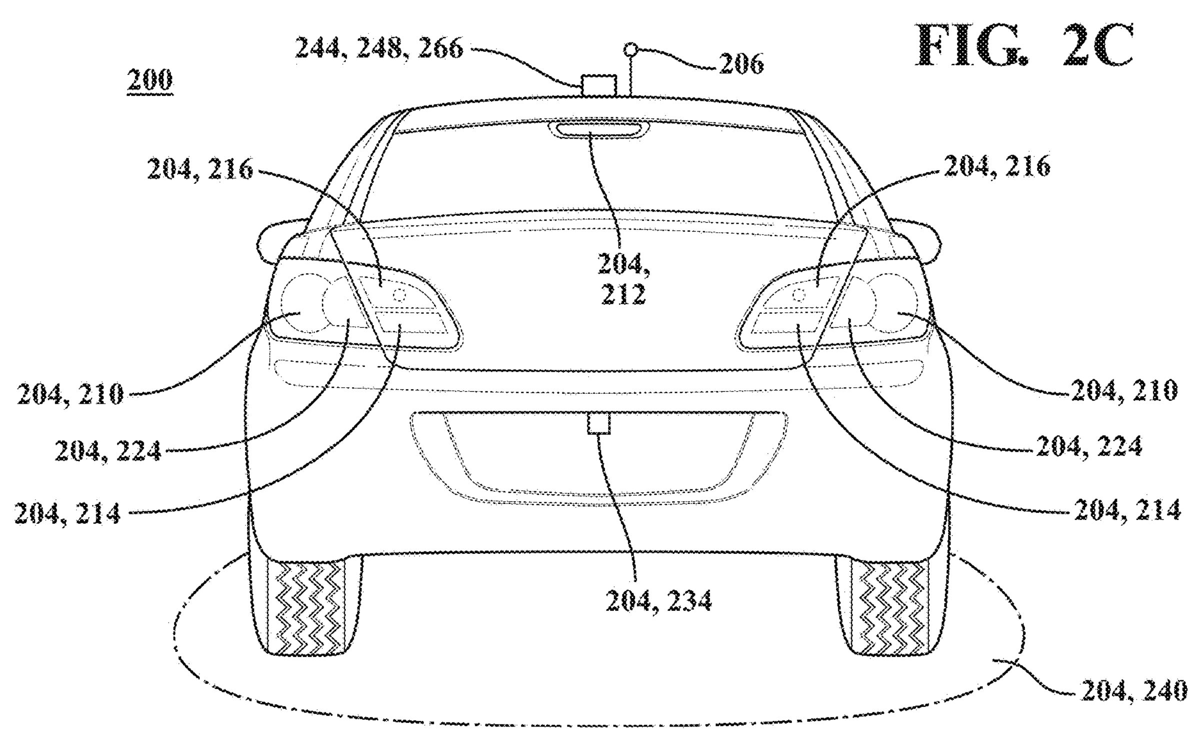
FIG. 3 is a block diagram that illustrates an example of a system for using a light of a parked vehicle to illuminate a path, according to the disclosed technologies.
Figure 3:
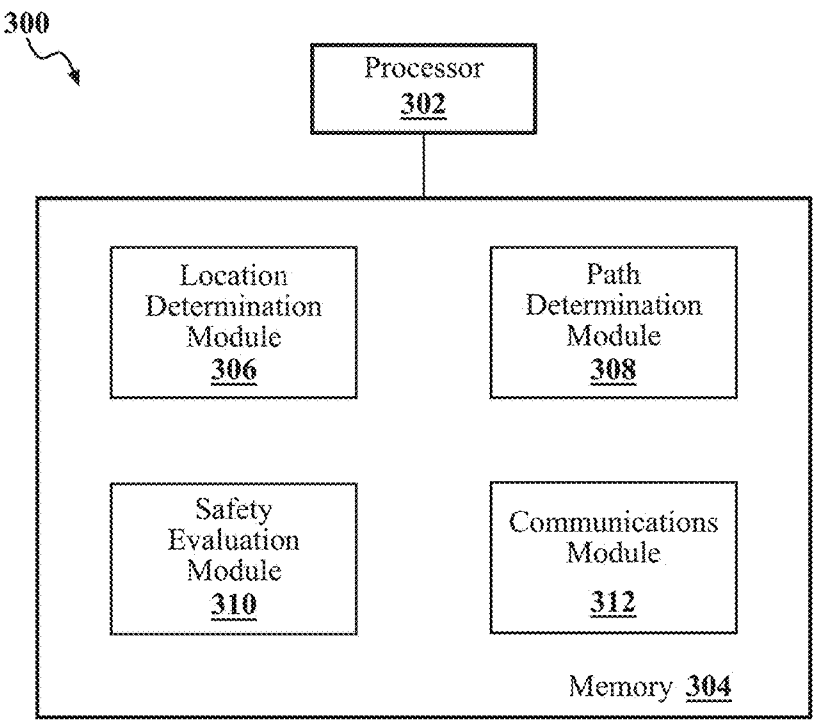

FIG. 3 is a block diagram that illustrates an example of a system 300 for using a light of a parked vehicle to illuminate a path, according to the disclosed technologies. For example, the system 300 can be the system 156 illustrated in FIG. 1. The system 300 can include, for example, a processor 302 and a memory 304. The memory 304 can be communicably coupled to the processor 302. For example, the memory 304 can store a location determination module 306, a path determination module 308, a safety evaluation module 310, and a communications module 312.

For example, the location determination module 306 can include instructions that function to control the processor 302 to determine a location of an individual and a location of a vehicle associated with the individual.

For example, the path determination module 308 can include instructions that function to control the processor 302 to determine one or more paths from the location of the individual to the location of the vehicle.

For example, the safety evaluation module 310 can include instructions that function to control the processor 302 to determine the path, of the one or more paths, based at least in part on a measurement of a safety criterion.

For example, the communications module 312 can include instructions that function to control the processor 302 to cause the light of the parked vehicle to illuminate the path. The parked vehicle can be different from the vehicle.

For example, the instructions to determine the location of the individual and the location of the vehicle associated with the individual can include two or more of: (1) instructions to determine, based on information from a sensor, the location of the individual, (2) instructions to determine, based on the information from the sensor, the location of the vehicle associated with the individual, (3) instructions to determine, based on information from a communications device, the location of the individual, or (4) instructions to determine, based on the information from the communications device, the location of the vehicle associated with the individual. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, the safety criterion can be with respect to an aspect of the path or the individual. For example, the aspect can be one or more of: (1) one or more of a characteristic or a condition of a road surface along the path or (2) one or more of a characteristic or a condition of the individual.

For example, the safety evaluation module 310 can further include instructions that function to control the processor 302 to determine the aspect. For example, the instructions to determine the aspect include one or more of: (1) instructions to determine, based on information from a sensor, the aspect or (2) instructions to determine, based on information from a communications device, the aspect. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like. For example, the instructions to determine the aspect can include instructions to determine, using an object recognition technique, the aspect.

With reference to FIGS. 1 and 2A-2C, for example: (1) the individual can be the first person 158 (e.g., Alice), (2) the vehicle associated with the individual can be the sixth vehicle 138, (3) the parked vehicle can be the first vehicle 133, (4) the light of the parked vehicle can be one or more of the side turn signal light 218, the mirror-mounted side turn signal light 220, the cornering light 226, the side marker light 232, the perimeter light 238, or the underglow light 240 of the first vehicle 133, and (5) the safety criterion with respect to the aspect (characteristic or condition) of the road surface along the path can be the puddle 152. For example, the light of the first vehicle 133 can cause an illumination 170 of at least a segment of a path 171 from the first person 158 (e.g., Alice) to the sixth vehicle 138. In this manner, the illumination 170 of the segment of the path 171 by the system 156 can be the segment of the path 171 at which the puddle 152 is located. Additionally or alternatively, the light 204 of the second vehicle 134 (or a light (not illustrated) disposed on the second column 110) can be used to illuminate the sixth vehicle 138 as an endpoint of the path 171.

For example, the location of the first person 158 (e.g., Alice) can be determined based on information from the first camera 122 via the communications device 126 and the communications device 157 of the system 156.

Additionally or alternatively, for example, the location of the first person 158 (e.g., Alice) can be determined based on information from the GNSS device 163 of the communications device 162 via the communications device 157 of the system 156.

For example, the location of the sixth vehicle 138 can be determined based on information from the camera 250 of the first vehicle 133 (or the camera 250 of the second vehicle 134) via the communications device 206 of the first vehicle 133 (or the communications device 206 of the second vehicle 134) and the communications device 157 of the system 156. For example, the information can include an image of a road surface marking label of the parking space B-2.

Additionally or alternatively, for example, the location of the sixth vehicle 138 can be determined based on information from the GNSS device 272 of the sixth vehicle 138 via the communications device 206 of the sixth vehicle 138 and the communications device 157 of the system 156.

For example, an existence of the puddle 152 can be determined based on information from the first camera 122 via the communications device 126 and the communications device 157 of the system 156. For example, the system 156 can determine the existence of the puddle 152 using an object recognition technique.

Returning to FIG. 3, for example, the object recognition technique can include one or more of a posture detection technique or a posture recognition technique.

In an implementation, for example, the one or more of the characteristic or the condition of the road surface along the path can include one or more of a hazard or an obstacle along the path. For example, the instructions to cause the light of the parked vehicle to illuminate the path can include instructions to cause a light of a particular type to illuminate the one or more of the hazard or the obstacle. For example, the particular type can be characterized by one or more of: (1) an illumination pattern of the light, (2) a measurement of a luminous intensity of the light being greater than a threshold luminous intensity, (3) a color of the light being a specific color, (4) the light having a flashing ability, (5) a light system having an ability to adjust the luminous intensity of the light in response to one or more of a measurement of an ambient lighting or a preference of the individual, (6) the light system having an ability to aim a beam of the light, or (7) the like.

With reference to FIGS. 1 and 2A-2C, for example: (1) the individual can be the second person 159 (e.g., Bob), (2) the vehicle associated with the individual can be the seventh vehicle 139, (3) the parked vehicle can be the second vehicle 134, (4) the light of the parked vehicle can be one or more of the side turn signal light 218 or the mirror-mounted side turn signal light 220 of the second vehicle 134, (5) the safety criterion with respect to the aspect (characteristic or condition) of the road surface along the path can be the debris 153, and (6) the safety criterion with respect to the aspect (characteristic or condition) of the individual can be the cane 164. For example, the light of the second vehicle 134 can cause an illumination 172 of at least a segment of a path 173 from the second person 159 (e.g., Bob) to the seventh vehicle 139.

For example, an existence of the debris 153 can be determined based on information from the second camera 123 via the communications device 126 and the communications device 157 of the system 156. For example, the system 156 can determine the existence of the debris 153 using an object recognition technique.

For example, an existence of the cane 164 can be determined based on information from the second camera 123 via the communications device 126 and the communications device 157 of the system 156. For example, the system 156 can determine the existence of the cane 164 using an object recognition technique. Additionally or alternatively, for example, the system 156 can determine the safety criterion with respect to the aspect (characteristic or condition) of the second person 159 (e.g., Bob) using one or more of a posture detection technique or a posture recognition technique to determine that a posture of the second person 159 (e.g., Bob) is stooped.

For example, the instructions to cause the light 204 of the second vehicle 134 to illuminate the path 173 can include instructions to cause a light of one or more of the side turn signal light 218 or the mirror-mounted side turn signal light 220 of the second vehicle 134 to illuminate the debris 153 because the one or more of the side turn signal light 218 or the mirror-mounted side turn signal light 220 can be characterized by one or more of: (1) a color of the one or more of the side turn signal light 218 or the mirror-mounted side turn signal light 220 being amber or (2) the one or more of the side turn signal light 218 or the mirror-mounted side turn signal light 220 having a flashing ability.

Returning to FIG. 3, for example, the path determination module 308 can further include instructions to determine that a measurement of a narrowest width of the path is greater than a width needed by the individual to traverse the path. For example, the instructions to determine that the measurement of the narrowest width of the path is greater than the width needed by the individual to traverse the path can include one or more of: (1) instructions to determine, based on information from a sensor, that the measurement of the narrowest width of the path is greater than the width needed by the individual to traverse the path or (2) instructions to determine, based on information from a communications device, that the measurement of the narrowest width of the path is greater than the width needed by the individual to traverse the path. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

With reference to FIGS. 1 and 2A-2C, for example: (1) the individual can be the third person 160 (e.g., Carol), (2) the vehicle associated with the individual can be the tenth vehicle 142, and (3) the parked vehicle can be the fourth vehicle 136.

For example, the width ($w_1$) needed by the third person 160 (e.g., Carol) to traverse the path (e.g., a width of the wheelchair 165 (e.g., 36 inches)) can be determined based on information from the third camera 124 via the communications device 126 and the communications device 157 of the system 156.

Additionally or alternatively, for example, the width ($w_1$) needed by the third person 160 (e.g., Carol) to traverse the path (e.g., the width of the wheelchair 165 (e.g., 36 inches)) can be determined based on information from the communications device 166 via the communications device 157 of the system 156. For example, the communications device 166 can be configured to operate an application associated with the system 156 and the third person 160 (e.g., Carol) can use the application to communicate, to the system 156, that the third person 160 (e.g., Carol) is sitting in the wheelchair 165 and information about the width ($w_1$) of the wheelchair 165.

For example, the measurement of the narrowest width of the path from the third person 160 (e.g., Carol) to the tenth vehicle 142 can be determined based on information from the ultrasonic ranging device 268 of the fourth vehicle 136 via the ECU 202 of the fourth vehicle 136, the communications device 206 of the fourth vehicle 136, and the communications device 157 of the system 156. For example, the ultrasonic ranging device 268 of the fourth vehicle 136 can determine that: (1) a distance ($w_2$) between the fourth vehicle 136 and the third vehicle 135 is less than the width ($w_1$) needed by the third person 160 (e.g., Carol) to traverse the path, but (2) a distance ($w_3$) between the fourth vehicle 136 and the fifth vehicle 137 is greater than the width ($w_1$) needed by the third person 160 (e.g., Carol) to traverse the path. Accordingly, for example, the instructions to determine the one or more paths from the location of the third person 160 (e.g., Carol) to the location of the tenth vehicle 142 can determine a path 174 between the fourth vehicle 136 and the fifth vehicle 137 rather than between the fourth vehicle 136 and the third vehicle 135.

Returning to FIG. 3, for example, the safety evaluation module 310 can further include instructions to determine an ability of the parked vehicle to illuminate the path. For example, the ability of the parked vehicle to illuminate the path can be a function of information associated with the parked vehicle. For example, the information can be one or more of: (1) a location of the parked vehicle, (2) a model of the parked vehicle, (3) a body style of the parked vehicle, (4) a trim level of the parked vehicle, (5) information about the light of the parked vehicle, or (6) the like. For example, the light can include one or more of a headlight, a brake light, a center high mount stop light, a reversing light, a turn signal light, a side turn signal light, a mirror-mounted side turn signal light, a front fog light, a rear fog light, a cornering light, a front position light, a daytime running light, a side marker light, a rear registration plate light, a running board light, a perimeter light, an underglow light, or the like. For example, the information about the light can include one or more of: (1) information about a position, on the parked vehicle, of the light, (2) information about an illumination pattern of the light, (3) information about a measurement of a luminous intensity of the light, (4) information about a color of the light, (5) information about an existence of a flashing ability of the light, (6) information about a light system having an ability to adjust the luminous intensity of the light in response to one or more of a measurement of an ambient lighting or a preference of the individual, (7) information about the light system having an ability to aim a beam of the light, or (8) the like. For example, such information can be determined from knowledge of one or more of: (1) the model of the parked vehicle, (2) the body style of the parked vehicle, or (3) the trim level of the parked vehicle. Additionally or alternatively, for example, the instructions to determine the ability of the parked vehicle to illuminate the path can include one or more of: (1) instructions to determine, based on information from a sensor, the ability or (2) instructions to determine, based on information from a communications device, the ability. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be disposed on one or more of the parked vehicle, another parked vehicle, an item of infrastructure, or the like.

With reference to FIGS. 1 and 2A-2C, for example: (1) the individual can be the third person 160 (e.g., Carol), (2) the vehicle associated with the individual can be the tenth vehicle 142, and (3) the parked vehicle can be the fourth vehicle 136.

For example, the ability of the fourth vehicle 136 to illuminate the path 174 can be a function of one or more of: (1) the location of the fourth vehicle 136, (2) the model of the fourth vehicle 136, (3) the body style of the fourth vehicle 136, (4) the trim level of the fourth vehicle 136, (5) the information about the light of the fourth vehicle 136, or (6) the like.

For example, one or more of: (1) the location of the fourth vehicle 136, (2) the model of the fourth vehicle 136, (3) the body style of the fourth vehicle 136, (4) the trim level of the fourth vehicle 136, or (5) the information about the light of the fourth vehicle 136 can be determined based on information from the camera 250 of the eighth vehicle 140 via the communications device 206 of the eighth vehicle 140 and the communications device 157 of the system 156. For example, based on the information from the camera 250 of the eighth vehicle 140, the system 156 can determine that the fourth vehicle 136 has the ability to illuminate the path 174. Additionally, for example, based on the information from the camera 250 of the ninth vehicle 141, the system 156 can determine that the fifth vehicle 137 lacks the ability to illuminate the path 174.

Returning to FIG. 3, for example: (1) the parked vehicle can include one or more of an electric vehicle or a hybrid electric vehicle and (2) the instructions to determine the ability of the parked vehicle to illuminate the path can include instructions to determine a state of a charge of an electric vehicle battery of the parked vehicle. For example, the instructions to determine the state of the charge can include instructions to determine, based on information from a communications device disposed on the parked vehicle, the state of the charge. For example, an ECU of the parked vehicle can be configured to operate an application programming interface (API) configured to determine the state of the charge of the electric vehicle battery. The communications device disposed on the parked vehicle can be communicably coupled to the ECU. For example, the ability of the parked vehicle to illuminate the path can be a function of the state of the charge of the electric vehicle battery of the parked vehicle being greater than a threshold charge.

With reference to FIGS. 1 and 2A-2C, for example: (1) the individual can be the third person 160 (e.g., Carol), (2) the vehicle associated with the individual can be the tenth vehicle 142, (3) the parked vehicle can be the fourth vehicle 136, and (4) the fourth vehicle 136 can include one or more of an electric vehicle or a hybrid electric vehicle.

For example, the ECU 202 of the fourth vehicle 136 can be configured to operate an API configured to determine a state of a charge of an electric vehicle battery of the fourth vehicle 136. For example, the state of the charge of the electric vehicle battery of the fourth vehicle 136 can be communicated via the communications device 206 of the fourth vehicle 136 and the communications device 157 of the system 156 to the system 156. For example, the system 156 can determine the ability of the fourth vehicle 136 to illuminate the path 174 as a function of the state of the charge of the electric vehicle battery of the fourth vehicle 136 being greater than a threshold charge.

Returning to FIG. 3, for example: (1) the parked vehicle can include a plurality of parked vehicles and (2) the instructions to determine the ability of the parked vehicle to illuminate the path can include instructions to determine the ability of each of the plurality of parked vehicles to illuminate a corresponding segment of the path.

With reference to FIGS. 1 and 2A-2C, for example: (1) the individual can be the third person 160 (e.g., Carol), (2) the vehicle associated with the individual can be the tenth vehicle 142, and (3) the plurality of parked vehicles can include the fourth vehicle 136 and the eighth vehicle 140.

For example: (1) based on the information from the camera 250 of the eighth vehicle 140, the system 156 can determine that the fourth vehicle 136 has the ability to illuminate a first segment 175 of the path 174 and (2) based on the information from the camera 250 of the fourth vehicle 136, the system 156 can determine that the eighth vehicle 140 has the ability to illuminate a second segment 176 of the path 174.

Returning to FIG. 3, for example, the instructions to cause the light of the parked vehicle to illuminate the path can include: (1) instructions to cause a first of the plurality of vehicles to illuminate, at a first time, a first corresponding segment of the path and (2) instructions to cause a second of the plurality of vehicles to illuminate, at a second time, a second corresponding segment of the path. For example, the second time can be after the first time.

With reference to FIGS. 1 and 2A-2C, for example: (1) the individual can be the third person 160 (e.g., Carol), (2) the vehicle associated with the individual can be the tenth vehicle 142, and (3) the plurality of parked vehicles can include the fourth vehicle 136 and the eighth vehicle 140.

For example, the system 156 can cause, via the communications device 157 and: (1) the communications device 206 of the fourth vehicle 136 and the ECU 202 of the fourth vehicle 136, the light 204 of the fourth vehicle 136 to illuminate, at a first time, the first segment 175 of the path 174 and (2) the communications device 206 of the eighth vehicle 140 and the ECU 202 of the eighth vehicle 140, the light 204 of the eighth vehicle 140 to illuminate, at a second time, the second segment 176 of the path 174. For example, the second time can be after the first time.

Returning to FIG. 3, for example: (1) at least two of the plurality of parked vehicles having the ability to illuminate the corresponding segment of the path can be one or more of an electric vehicle or a hybrid electric vehicle, (2) the instructions to determine the ability of the parked vehicle to illuminate the path can include instructions to determine that a state of a charge of an electric vehicle battery of a first of the at least two of the plurality of parked vehicles is greater than a state of a charge of an electric vehicle battery of a second of the at least two of the plurality of parked vehicles, and (3) the instructions to cause the light of the parked vehicle to illuminate the path can include instructions to cause the first of the at least two of the plurality of vehicles to illuminate the corresponding segment of the path.

With reference to FIGS. 1 and 2A-2C, for example: (1) the individual can be the third person 160 (e.g., Carol), (2) the vehicle associated with the individual can be the tenth vehicle 142, (3) the plurality of parked vehicles can include the fourth vehicle 136 and the fifth vehicle 137, and (4) each of the fourth vehicle 136 and the fifth vehicle 137 can include one or more of an electric vehicle or a hybrid electric vehicle.

For example, the system 156 can determine that a state of a charge of an electric vehicle battery of the fourth vehicle 136 is greater than a state of a charge of an electric vehicle battery of the fifth vehicle 137. Accordingly, for example, the system 156 can cause the light 204 of the fourth vehicle 136 to illuminate the first segment 175 of the path 174 rather than the light 204 of the fifth vehicle 137.

Returning to FIG. 3, for example: (1) the path can include a plurality of paths and (2) the instructions to cause the light of the parked vehicle to illuminate the path can include: (a) instructions to cause a first of the plurality of vehicles to illuminate a specific path of the plurality of paths and (b) instructions to cause a second of the plurality of vehicles to illuminate one or more other paths of the plurality of paths.

With reference to FIGS. 1 and 2A-2C, for example: (1) the individual can be the fourth person 161 (e.g., Dave), (2) the vehicle associated with the individual can be the sixteenth vehicle 148, (3) the plurality of parked vehicles can include the eleventh vehicle 143, the twelfth vehicle 144, the thirteenth vehicle 145, the fourteenth vehicle 146, the fifteenth vehicle 147, the seventeenth vehicle 149, the eighteenth vehicle 150, and the nineteenth vehicle 151, and (4) the plurality of paths can include a path 177, a path 178, a path 179, and a path 180.

For example, the system 156 can cause: (1) the light 204 of the nineteenth vehicle 151, the light 204 of the eighteenth vehicle 150, the light 204 of the seventeenth vehicle 149, and the light 204 of the fifteenth vehicle 147 to illuminate the path 177, (2) the light 204 of the thirteenth vehicle 145, the light 204 of the fourteenth vehicle 146, and the light 204 of the fifteenth vehicle 147 to illuminate the path 178, (3) the light 204 of the twelfth vehicle 144, the light 204 of the thirteenth vehicle 145, the light 204 of the fourteenth vehicle 146, and the light 204 of the fifteenth vehicle 147 to illuminate the path 179, and (4) the light 204 of the eleventh vehicle 143, the light 204 of the twelfth vehicle 144, the light 204 of the thirteenth vehicle 145, the light 204 of the fourteenth vehicle 146, and the light 204 of the fifteenth vehicle 147 to illuminate the path 180. For example, the system 156 can be configured to cause a luminous intensity of an illumination of each of the path 177, the path 178, the path 179, and the path 180 to be based on one or more criteria. For example, the one or more criteria can include: (1) a ranked determination of a degree of safety of the path 177, the path 178, the path 179, and the path 180, (2) a measurement of a distance traversed along the path 177, the path 178, the path 179, and the path 180, or (3) the like.

Returning to FIG. 3, for example: (1) the safety evaluation module 310 can further include instructions to determine a preference of the individual for the specific path and (2) the communications module 312 can further include instructions to cause, in response to a determination of the preference, the second of the plurality of vehicles to cease to illuminate the one or more other paths.

For example, the instructions to determine the preference can include one or more of: (1) instructions to determine, based on information from a sensor, the preference, (2) instructions to determine, based on information from a communications device, the preference, or (3) instructions to determine, using a machine learning technique, the preference. For example, the sensor can include one or more of an imaging device, a ranging device, a temperature sensor, a microphone, an electronic nose, or the like. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, the instructions to determine, based on the information from the sensor, the preference can include instructions to determine, from an analysis of the information from the sensor, a meaning of a body language of the individual.

For example, the communications module 312 can further include instructions to cause a signal to be sent to the communications device to cause representations of the specific path and the one or more other paths to be presented on the communications device.

For example, the safety evaluation module 310 can further include instructions to determine a distaste of the individual for the one or more other paths. For example, the instructions to determine the distaste can include one or more of: (1) instructions to determine, based on information from a sensor, the distaste, (2) instructions to determine, based on information from a communications device, the distaste, or (3) instructions to determine, using a machine learning technique, the distaste.

For example, the sensor can include one or more of an imaging device, a ranging device, a temperature sensor, a microphone, an electronic nose, or the like. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, the instructions to determine, based on the information from the sensor, the distaste can include instructions to determine, from an analysis of the information from the sensor, a meaning of a body language of the individual.

With reference to FIGS. 1 and 2A-2C, for example: (1) the individual can be the fourth person 161 (e.g., Dave), (2) the vehicle associated with the individual can be the sixteenth vehicle 148, (3) the plurality of parked vehicles can include the eleventh vehicle 143, the twelfth vehicle 144, the thirteenth vehicle 145, the fourteenth vehicle 146, the fifteenth vehicle 147, the seventeenth vehicle 149, the eighteenth vehicle 150, and the nineteenth vehicle 151, and (4) the plurality of paths can include the path 177, the path 178, the path 179, and the path 180.

For example, the system 156 can determine the preference of the fourth person 161 (e.g., Dave) for the path 180 from an analysis of the information from the fourth camera 125, via the communications device 126 and the communications device 157 of the system 156, to determine a meaning of a body language of the fourth person 161 (e.g., Dave). For example, from the analysis of the information, the system 156 can determine that the fourth person 161 (e.g., Dave), by initially moving west rather than east after entering the parking garage 102 through the fourth door 118, has a distaste for the path 177. Alternatively, for example, the system 156 can be configured to illuminate the path 177 until a determination that the fourth person 161 (e.g., Dave) has moved west rather than east and thereafter illuminate the path 178.

Additionally, for example, the system 156, based on information from the temperature sensor 127 and using a machine learning technique, can determine that the fourth person 161 (e.g., Dave) has a distaste for paths in which the fourth person 161 (e.g., Dave) may be exposed to a temperature value less than a first threshold temperature value (or greater than a second threshold temperature value).

For example, the system 156 can cause, in response to a determination that the preference of the fourth person 161 (e.g., Dave) is other than the path 177, the seventeenth vehicle 149, the eighteenth vehicle 150, and the nineteenth vehicle 151 to cease to illuminate the path 180.

For example, from the analysis of the information, the system 156 can determine that the fourth person 161 (e.g., Dave), by continuing to move past a point 182 on the path 178 at which a direction of the path 178 changes from west to north, has a distaste for the path 178. Alternatively, for example, the system 156 can be configured to illuminate the path 178 until a determination that the fourth person 161 (e.g., Dave) has moved past the point 182 and thereafter illuminate the path 179.

Additionally or alternatively, for example, a person (not illustrated) can be located along the path 178 between the second interior wall 106 and the third interior wall 107. For example, the system 156 can be configured to analyze a behavior of the person and to determine an extent to which this behavior effects the measurement of the safety criterion of the path 178.

Additionally, for example, the system 156, based on information from the microphone 128 and using a machine learning technique, can determine that the fourth person 161 (e.g., Dave) has a distaste for paths in which the fourth person 161 (e.g., Dave) may be exposed to a sound: (1) associated with a sound classification that the fourth person 161 (e.g., Dave) dislikes, (2) having a decibel value greater than a threshold decibel value, or (3) both.

For example, from the analysis of the information, the system 156 can determine that the fourth person 161 (e.g., Dave), by continuing to move past a point 181 on the path 179 at which a direction of the path 179 changes from west to north, has a distaste for the path 179. Alternatively, for example, the system 156 can be configured to illuminate the path 179 until a determination that the fourth person 161 (e.g., Dave) has moved past the point 181 and thereafter illuminate the path 180.

Additionally, for example, the system 156, based on information from the electronic nose 129 and using a machine learning technique, can determine that the fourth person 161 (e.g., Dave) has a distaste for paths in which the fourth person 161 (e.g., Dave) may be exposed to an odor: (1) associated with an odor classification that the fourth person 161 (e.g., Dave) dislikes, (2) having an intensity value greater than a threshold intensity value, or (3) both.

For example, from the analysis of the information, the system 156 can determine that the fourth person 161 (e.g., Dave), by continuing to move past the point 181 on the path 179 at which a direction of the path 179 changes from west to north, has a preference for the path 180.

Additionally or alternatively, for example, the system 156 can cause a signal to be sent to the communications device 168 to cause representations of the path 177, the path 178, the path 179, and the path 180 to be presented on the communications device 168. For example, the communications device 168 can be configured to operate an application associated with the system 156 and the fourth person 161 (e.g., Dave) can use the application to communicate, to the system 156, that the fourth person 161 (e.g., Dave) one or more of has a preference for the path 177 or a distaste for one or more of the path 178, the path 179, or the path 180.

Additionally, or alternatively, information from one or more of the camera 250, the color camera 252, the stereoscopic camera 254, the video camera 256, or the digital video camera 258 of one or more of the eleventh vehicle 143, the twelfth vehicle 144, the thirteenth vehicle 145, the fourteenth vehicle 146, the fifteenth vehicle 147, the seventeenth vehicle 149, the eighteenth vehicle 150, or the nineteenth vehicle 151 can be communicated via the ECU 202, the communications device 206, and the communications device 157 of the system 156, which can cause the signal to be sent to the communications device 168 to cause images of the path 177, the path 178, the path 179, and the path 180 to be presented on the communications device 168. For example, the communications device 168 can be a smartphone, a pair of smart glasses, or the like.

Returning to FIG. 3, for example, the system 300 can also be configured to cause an appearance of an illumination of a first path, produced for a first individual, to be different from an appearance of an illumination of a second path produced for a second individual. For example: (1) the illumination of the first path can include a first pattern and (2) the illumination of the second path can include a second pattern. In this manner: (1) the appearance of the first path can be customized for the first individual and (2) the appearance of the second path can be customized for the second individual. For example, one or more of the first pattern or the second pattern can include a dashed line.

Figure 4A:
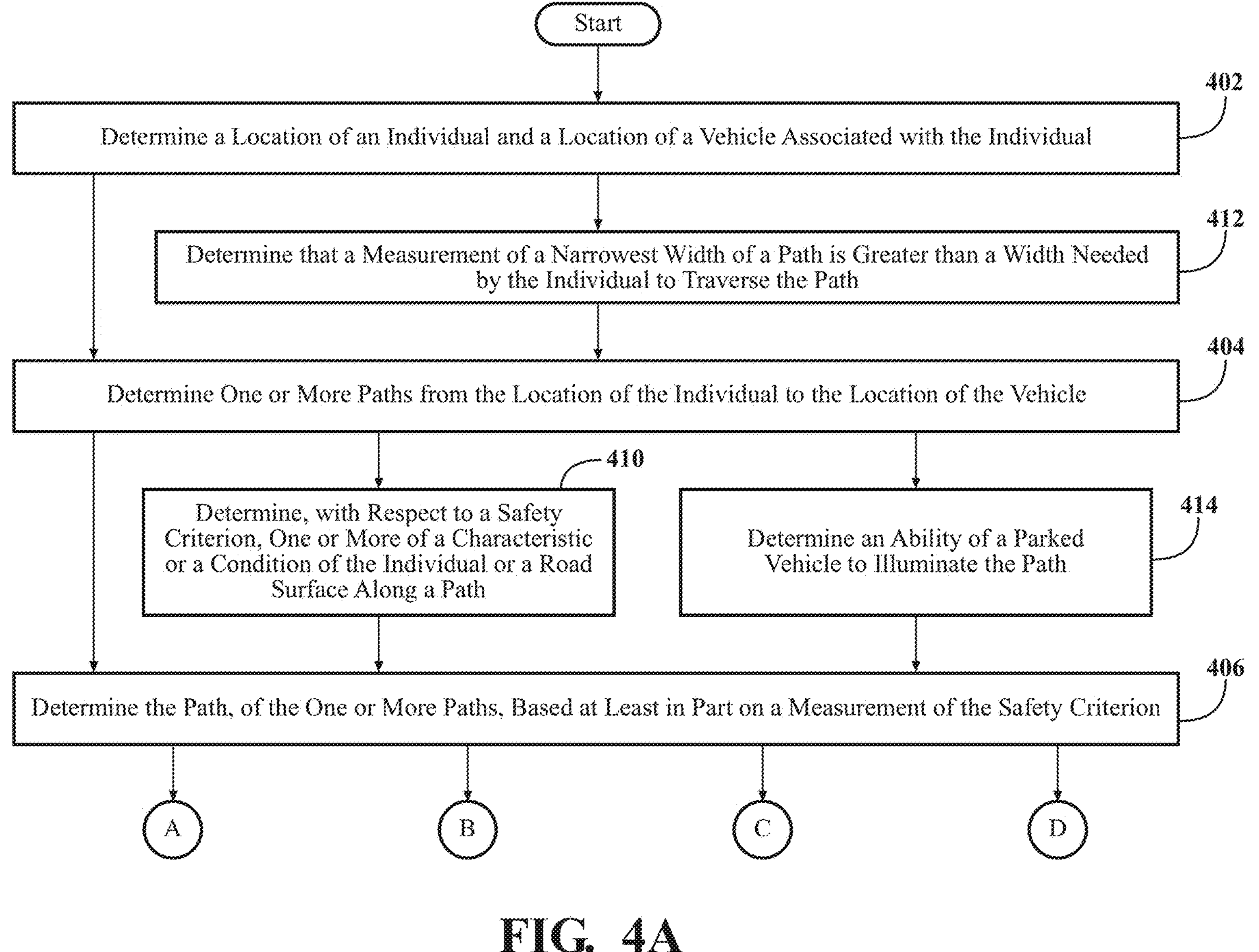
FIGS. 4A and 4B include a flow diagram that illustrates an example of a method that is associated with using a light of a parked vehicle to illuminate a path, according to the disclosed technologies.
Figure 4B:
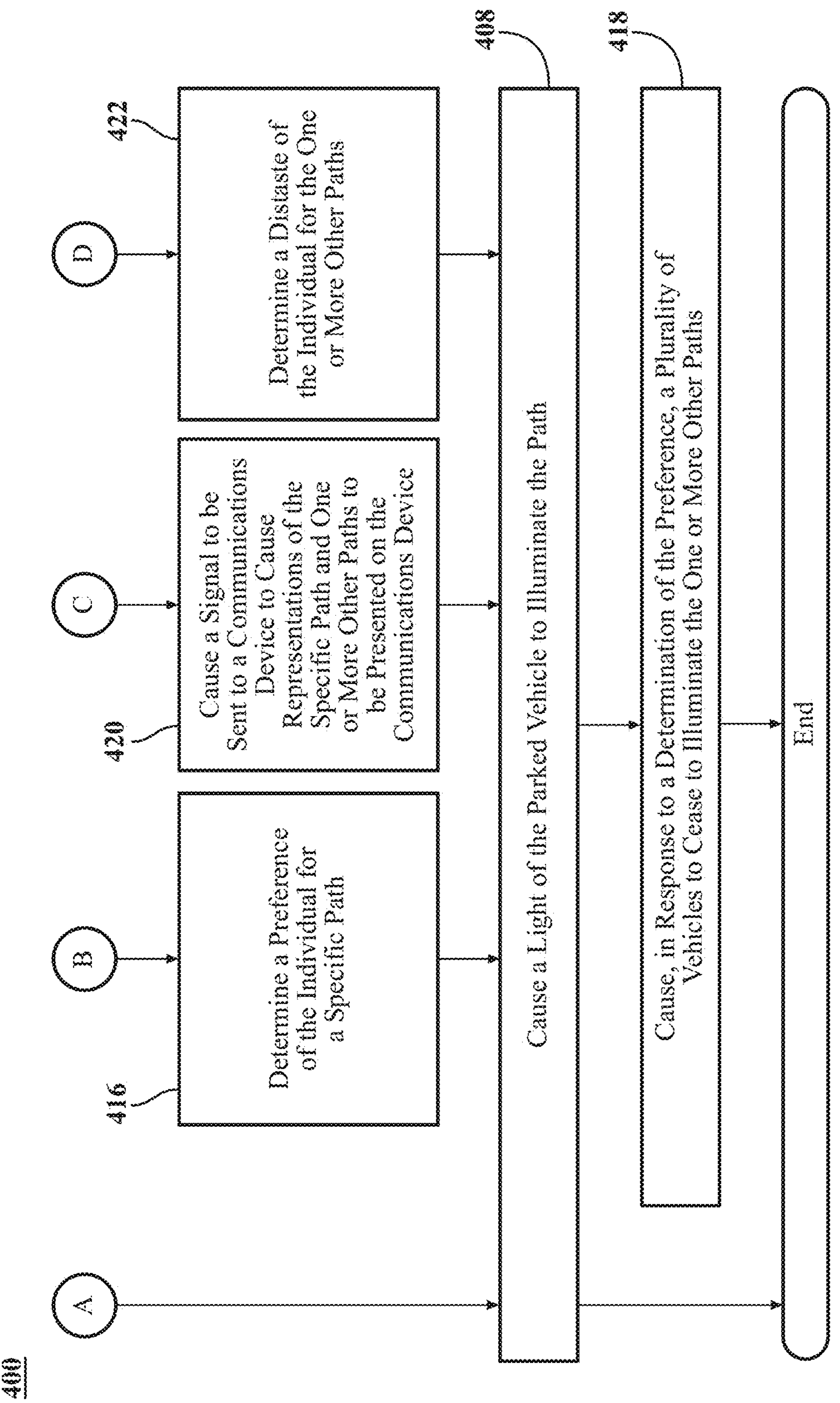

FIGS. 4A and 4B include a flow diagram that illustrates an example of a method 400 that is associated with using a light of a parked vehicle to illuminate a path, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In FIG. 4A, in the method 400, at an operation 402, for example, the location determination module 306 can determine a location of an individual and a location of a vehicle associated with the individual.

For example, at an operation 404, the path determination module 308 can determine one or more paths from the location of the individual to the location of the vehicle.

For example, at an operation 406, the safety evaluation module 310 can determine the path, of the one or more paths, based at least in part on a measurement of a safety criterion.

In FIG. 4B, in the method 400, at an operation 408, for example, the communications module 312 can cause the light of the parked vehicle to illuminate the path. The parked vehicle can be different from the vehicle.

In FIG. 4A, in the method 400, at the operation 402, for example, the location determination module 306 can determine the location of the individual and the location of the vehicle associated by two or more of: (1) determining, based on information from a sensor, the location of the individual, (2) determining, based on the information from the sensor, the location of the vehicle associated with the individual, (3) determining, based on information from a communications device, the location of the individual, or (4) determining, based on the information from the communications device, the location of the vehicle associated with the individual. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, the safety criterion can be with respect to an aspect of the path or the individual. For example, the aspect can be one or more of: (1) one or more of a characteristic or a condition of a road surface along the path or (2) one or more of a characteristic or a condition of the individual.

Additionally, at an operation 410, for example, the safety evaluation module 310 can determine the aspect. For example, the safety evaluation module 310 can determine the aspect by one or more of: (1) determining, based on information from a sensor, the aspect or (2) determining, based on information from a communications device, the aspect. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like. For example, at the operation 410, the safety evaluation module 310 can determine the aspect by determining, using an object recognition technique, the aspect. For example, the object recognition technique can include one or more of a posture detection technique or a posture recognition technique.

In an implementation, for example, the one or more of the characteristic or the condition of the road surface along the path can include one or more of a hazard or an obstacle along the path. In FIG. 4B, in the method 400, at the operation 408, for example, the communications module 312 can cause a light of a particular type to illuminate the one or more of the hazard or the obstacle. For example, the particular type can be characterized by one or more of: (1) an illumination pattern of the light, (2) a measurement of a luminous intensity of the light being greater than a threshold luminous intensity, (3) a color of the light being a specific color, (4) the light having a flashing ability, (5) a light system having an ability to adjust the luminous intensity of the light in response to one or more of a measurement of an ambient lighting or a preference of the individual, (6) the light system having an ability to aim a beam of the light, or (7) the like.

Additionally, in FIG. 4A, in the method 400, at an operation 412, for example, the path determination module 308 can determine that a measurement of a narrowest width of the path is greater than a width needed by the individual to traverse the path. For example, at the operation 412, the path determination module 308 can determine that the measurement of the narrowest width of the path is greater than the width needed by the individual to traverse the path by one or more of: (1) determining, based on information from a sensor, that the measurement of the narrowest width of the path is greater than the width needed by the individual to traverse the path or (2) determining, based on information from a communications device, that the measurement of the narrowest width of the path is greater than the width needed by the individual to traverse the path. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

Additionally, at an operation 414, for example, the safety evaluation module 310 can determine an ability of the parked vehicle to illuminate the path. For example, the ability of the parked vehicle to illuminate the path can be a function of information associated with the parked vehicle. For example, the information can be one or more of: (1) a location of the parked vehicle, (2) a model of the parked vehicle, (3) a body style of the parked vehicle, (4) a trim level of the parked vehicle, (5) information about the light of the parked vehicle, or (6) the like. For example, the light can include one or more of a headlight, a brake light, a center high mount stop light, a reversing light, a turn signal light, a side turn signal light, a mirror-mounted side turn signal light, a front fog light, a rear fog light, a cornering light, a front position light, a daytime running light, a side marker light, a rear registration plate light, a running board light, a perimeter light, an underglow light, or the like. For example, the information about the light can include one or more of: (1) information about a position, on the parked vehicle, of the light, (2) information about an illumination pattern of the light, (3) information about a measurement of a luminous intensity of the light, (4) information about a color of the light, (5) information about an existence of a flashing ability of the light, (6) information about a light system having an ability to adjust the luminous intensity of the light in response to at least one of a measurement of an ambient lighting or a preference of the individual, (7) information about the light system having an ability to aim a beam of the light, or (8) the like. For example, such information can be determined from knowledge of one or more of: (1) the model of the parked vehicle, (2) the body style of the parked vehicle, or (3) the trim level of the parked vehicle. Additionally or alternatively, for example, at the operation 414, the safety evaluation module 310 can determine the ability of the parked vehicle to illuminate the path by one or more of: (1) determining, based on information from a sensor, the ability or (2) determining, based on information from a communications device, the ability. For example, the sensor can include one or more of an imaging device or a ranging device. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be disposed on one or more of the parked vehicle, another parked vehicle, an item of infrastructure, or the like.

For example: (1) the parked vehicle can include one or more of an electric vehicle or a hybrid electric vehicle and (2) at the operation 414, the safety evaluation module 310 can determine the ability of the parked vehicle to illuminate the path by determining a state of a charge of an electric vehicle battery of the parked vehicle. For example, at the operation 414, the safety evaluation module 310 can determine the state of the charge by determining, based on information from a communications device disposed on the parked vehicle, the state of the charge. For example, an ECU of the parked vehicle can be configured to operate an application programming interface (API) configured to determine the state of the charge of the electric vehicle battery. The communications device disposed on the parked vehicle can be communicably coupled to the ECU. For example, the ability of the parked vehicle to illuminate the path can be a function of the state of the charge of the electric vehicle battery of the parked vehicle being greater than a threshold charge.

For example: (1) the parked vehicle can include a plurality of parked vehicles and (2) at the operation 414, the safety evaluation module 310 can determine the ability of the parked vehicle to illuminate the path by determining the ability of each of the plurality of parked vehicles to illuminate a corresponding segment of the path.

In FIG. 4B, in the method 400, at the operation 408, for example, the communications module 312 can cause the light of the parked vehicle to illuminate the path by: (1) causing a first of the plurality of vehicles to illuminate, at a first time, a first corresponding segment of the path and (2) causing a second of the plurality of vehicles to illuminate, at a second time, a second corresponding segment of the path. For example, the second time can be after the first time.

For example: (1) at least two of the plurality of parked vehicles having the ability to illuminate the corresponding segment of the path can be one or more of an electric vehicle or a hybrid electric vehicle, (2) in FIG. 4A, in the method 400, at the operation 414, the safety evaluation module 310 can determine the ability of the parked vehicle to illuminate the path by determining that a state of a charge of an electric vehicle battery of a first of the at least two of the plurality of parked vehicles is greater than a state of a charge of an electric vehicle battery of a second of the at least two of the plurality of parked vehicles, and (3) in FIG. 4B, in the method 400, at the operation 408, the communications module 312 can cause the light of the parked vehicle to illuminate the path by causing the first of the at least two of the plurality of vehicles to illuminate the corresponding segment of the path.

For example: (1) the path can include a plurality of paths and (2) at the operation 408, the communications module 312 can cause the light of the parked vehicle to illuminate the path by: (a) causing a first of the plurality of vehicles to illuminate a specific path of the plurality of paths and (b) causing a second of the plurality of vehicles to illuminate one or more other paths of the plurality of paths.

Additionally: (1) at an operation 416, for example, the safety evaluation module 310 can determine a preference of the individual for the specific path and (2) at an operation 418, for example, the communications module 312 can cause, in response to a determination of the preference, the second of the plurality of vehicles to cease to illuminate the one or more other paths.

For example, at the operation 416, the safety evaluation module 310 can determine the preference by one or more of: (1) determining, based on information from a sensor, the preference, (2) determining, based on information from a communications device, the preference, or (3) determining, using a machine learning technique, the preference. For example, the sensor can include one or more of an imaging device, a ranging device, a temperature sensor, a microphone, an electronic nose, or the like. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, at the operation 416, the safety evaluation module 310 can determine, based on the information from the sensor, the preference by determining, from an analysis of the information from the sensor, a meaning of a body language of the individual.

Additionally, at an operation 420, for example, the communications module 312 can cause a signal to be sent to the communications device to cause representations of the specific path and the one or more other paths to be presented on the communications device.

Additionally, at an operation 422, for example, the safety evaluation module 310 can determine a distaste of the individual for the one or more other paths. For example, at the operation 422, the safety evaluation module 310 can determine the distaste by one or more of: (1) determining, based on information from a sensor, the distaste, (2) determining, based on information from a communications device, the distaste, or (3) determining, using a machine learning technique, the distaste.

For example, the sensor can include one or more of an imaging device, a ranging device, a temperature sensor, a microphone, an electronic nose, or the like. For example, the one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, an infrared ranging device, or the like. For example, the sensor can be disposed on one or more of the parked vehicle, another parked vehicle, an item of infrastructure, or the like. For example, the communications device can be one or more of carried by the individual or disposed on one or more of the parked vehicle, another parked vehicle, an item of infrastructure, or the like.

For example, at the operation 422, the safety evaluation module 310 can determine, based on the information from the sensor, the distaste by determining, from an analysis of the information from the sensor, a meaning of a body language of the individual.

Figure 2B:
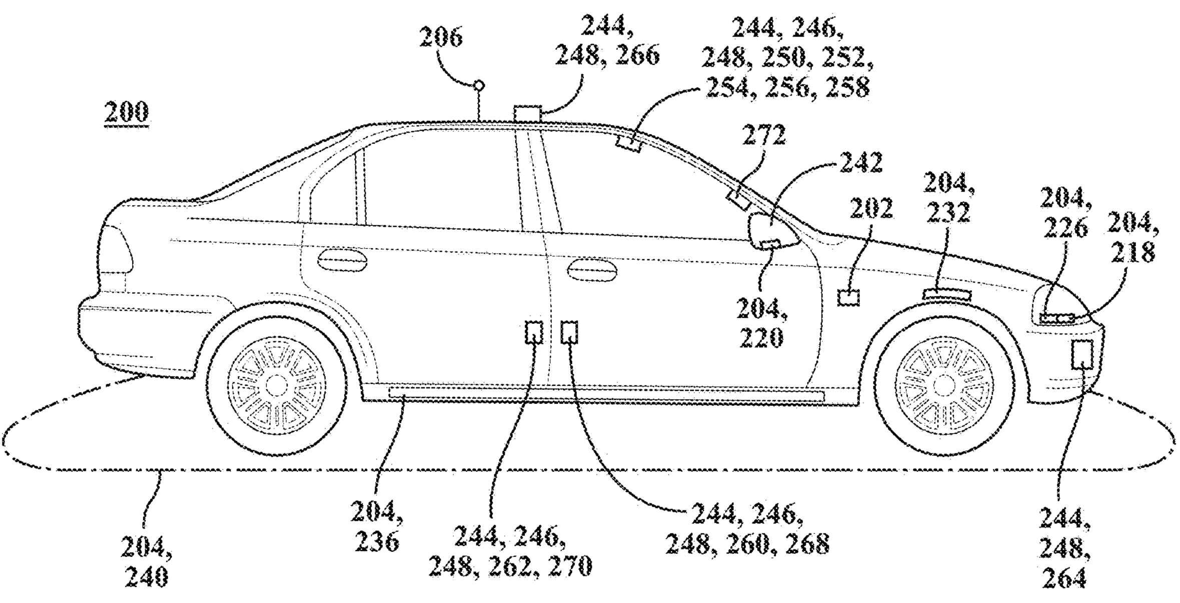
Figure 5:
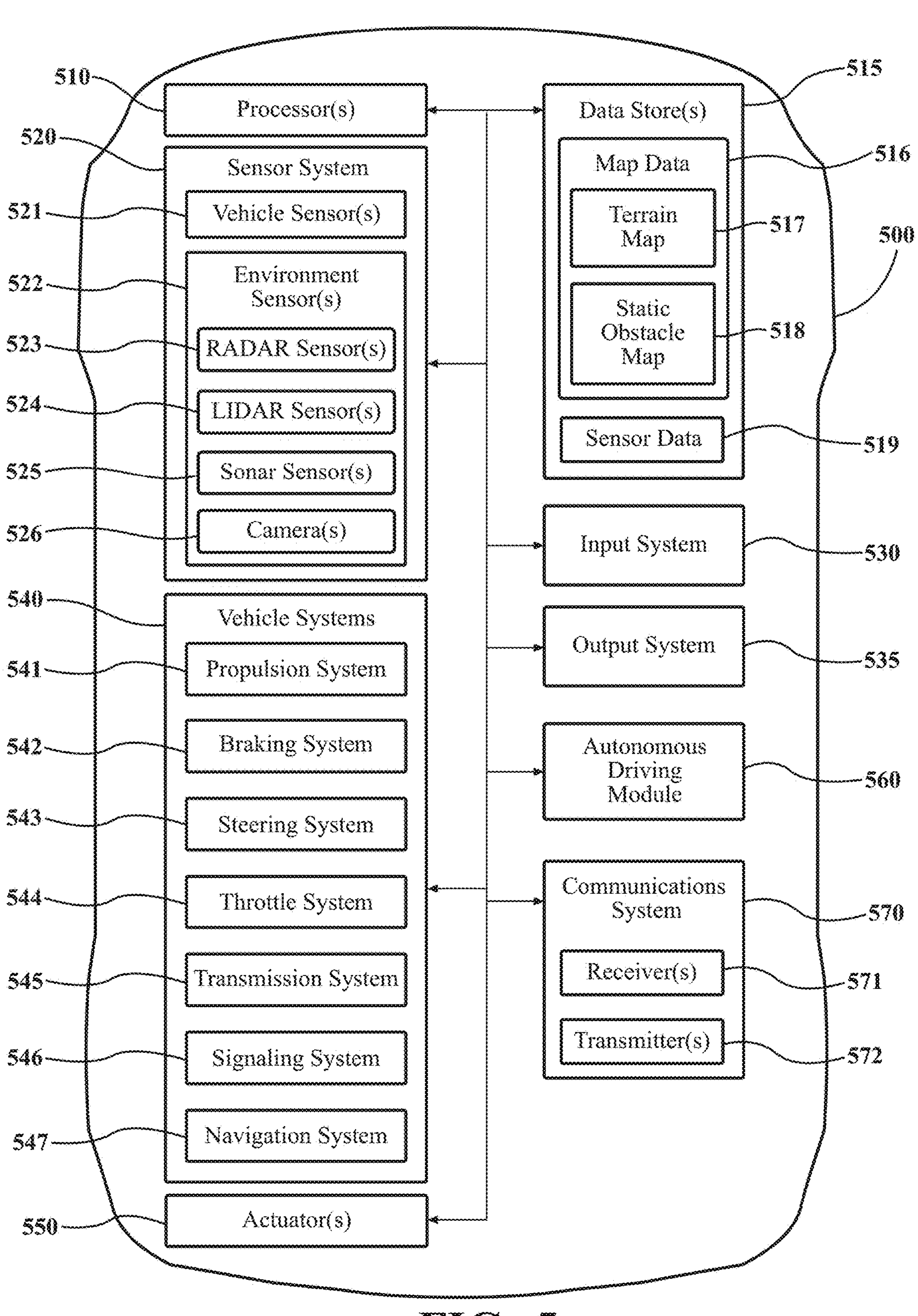
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 133 (illustrated in FIG. 1), the second vehicle 134 (illustrated in FIG. 1), the third vehicle 135 (illustrated in FIG. 1), the fourth vehicle 136 (illustrated in FIG. 1), the fifth vehicle 137 (illustrated in FIG. 1), the sixth vehicle 138 (illustrated in FIG. 1), the seventh vehicle 139 (illustrated in FIG. 1), the eighth vehicle 140 (illustrated in FIG. 1), the ninth vehicle 141 (illustrated in FIG. 1), the tenth vehicle 142 (illustrated in FIG. 1), the eleventh vehicle 143 (illustrated in FIG. 1), the twelfth vehicle 144 (illustrated in FIG. 1), the thirteenth vehicle 145 (illustrated in FIG. 1), the fourteenth vehicle 146 (illustrated in FIG. 1), the fifteenth vehicle 147 (illustrated in FIG. 1), the sixteenth vehicle 148 (illustrated in FIG. 1), the seventeenth vehicle 149 (illustrated in FIG. 1), the eighteenth vehicle 150 (illustrated in FIG. 1), the nineteenth vehicle 151 (illustrated in FIG. 1), or the vehicle 200 (illustrated in FIG. 2) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, and a communications system 570.

In one or more arrangements, the one or more processors 510 can be a main processor of the vehicle 500. For example, the one or more processors 510 can be an electronic control unit (ECU). For example, functions and/or operations of the electronic control unit (ECU) 202 (illustrated in FIG. 2) can be realized by the one or more processors 510.

The one or more data stores 515 can store, for example, one or more types of data. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. For example, functions and/or operations of the global navigation satellite system (GNSS) device 272 (illustrated in FIG. 2) can be realized by the one or more vehicle sensors 521. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the radar device 264 (illustrated in FIG. 2) can be realized by the one or more radar sensors 523. For example, functions and/or operations of the lidar device 266 (illustrated in FIG. 2) can be realized by the one or more lidar sensors 524. For example, functions and/or operations of the ultrasonic imaging device 260 (illustrated in FIG. 2) or the ultrasonic ranging device 268 (illustrated in FIG. 2) can be realized by the one or more sonar sensors 525. For example, functions and/or operations of the camera 250 (illustrated in FIG. 2), the color camera 252 (illustrated in FIG. 2), the stereoscopic camera 254 (illustrated in FIG. 2), the video camera 256 (illustrated in FIG. 2), the digital video camera 258 (illustrated in FIG. 2), the infrared imaging device 262 (illustrated in FIG. 2), or the infrared ranging device 270 (illustrated in FIG. 2) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 206 (illustrated in FIG. 2) can be realized by the communications system 570.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2A-2C, 3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

a location determination module including instructions that, when executed by the processor, cause the processor to determine a location of an individual and a location of a vehicle associated with the individual;

a path determination module including instructions that, when executed by the processor, cause the processor to determine at least one path from the location of the individual to the location of the vehicle;

a safety evaluation module including instructions that, when executed by the processor, cause the processor to determine a path, of the at least one path, based at least in part on a measurement of a safety criterion; and a communications module including instructions that, when executed by the processor, cause the processor to cause a light of a particular type of a parked vehicle to illuminate the path, the parked vehicle being different from the vehicle, the particular type being characterized by at least one of:

a dashed line illumination pattern of the light, a measurement of a luminous intensity of the light being greater than a threshold luminous intensity, a color of the light being a specific color, or a light system having an ability to adjust the luminous intensity of the light in response to at least one of a measurement of an ambient lighting or a preference of the individual.

2. The system of claim 1, wherein the safety criterion is with respect to an aspect of the path or the individual, the aspect being at least one of:

at least one of a characteristic or a condition of a road surface along the path, or at least one of a characteristic or a condition of the individual.

3. The system of claim 2, wherein the safety evaluation module further includes instructions to determine the aspect.

4. The system of claim 3, wherein the instructions to determine the aspect include instructions to determine, using an object recognition technique, the aspect.

5. The system of claim 4, wherein the object recognition technique comprises at least one of a posture detection technique or a posture recognition technique.

6. The system of claim 2, wherein:

the at least one of the characteristic or the condition of the road surface along the path comprises at least one of a hazard or an obstacle along the path, and the instructions to cause the light of the particular type of the parked vehicle to illuminate the path include instructions to cause the light of the particular type to illuminate the at least one of the hazard or the obstacle, the particular type being further characterized by a light system having an ability to aim a beam of the light.

7. The system of claim 1, wherein the path determination module further includes instructions to determine that a measurement of a narrowest width of the path is greater than a width needed by the individual to traverse the path.

8. The system of claim 1, wherein the safety evaluation module further includes instructions to determine an ability of the parked vehicle to illuminate the path.

9. The system of claim 8, wherein the ability of the parked vehicle to illuminate the path is a function of information associated with the parked vehicle, the information being at least one of:

a location of the parked vehicle, a model of the parked vehicle, a body style of the parked vehicle, a trim level of the parked vehicle, or information about the light of the parked vehicle.

10. The system of claim 8, wherein:

the parked vehicle comprises at least one of an electric vehicle or a hybrid electric vehicle, and the instructions to determine the ability of the parked vehicle to illuminate the path include instructions to determine a state of a charge of an electric vehicle battery of the parked vehicle.

11. The system of claim 8, wherein:

the parked vehicle comprises a plurality of parked vehicles, and the instructions to determine the ability of the parked vehicle to illuminate the path include instructions to determine the ability of each of the plurality of parked vehicles to illuminate a corresponding segment of the path.

12. The system of claim 11, wherein:

the path comprises a plurality of paths, and the instructions to cause the light of the parked vehicle to illuminate the path include:

instructions to cause a first of the plurality of vehicles to illuminate a specific path of the plurality of paths; and instructions to cause a second of the plurality of vehicles to illuminate at least one other path of the plurality of paths.

13. The system of claim 12, wherein:

the safety evaluation module further includes instructions to determine a preference of the individual for the specific path; and the communications module further includes instructions to cause, in response to a determination of the preference, the second of the plurality of vehicles to cease to illuminate the at least one other path.

14. The system of claim 13, wherein the instructions to determine the preference include at least one of:

instructions to determine, based on information from a sensor, the preference, instructions to determine, based on information from the communications device, the preference, or instructions to determine, using a machine learning technique, the preference.

15. The system of claim 14, wherein the instructions to determine, based on the information from the sensor, the preference include instructions to determine, from an analysis of the information from the sensor, a meaning of a body language of the individual.

16. The system of claim 14, wherein the communications module further includes instructions to cause a signal to be sent to the communications device to cause representations of the specific path and the at least one other path to be presented on the communications device.

17. The system of claim 13, wherein the safety evaluation module further includes instructions to determine a distaste of the individual for the at least one other path.

18. A method, comprising:

determining, by a processor, a location of an individual and a location of a vehicle associated with the individual;

determining, by the processor, at least one path from the location of the individual to the location of the vehicle;

determining, by the processor, a path, of the at least one path, based at least in part on a value of a measurement of a safety criterion; and causing, by the processor, a light of a particular type of a parked vehicle to illuminate the path, the parked vehicle being different from the vehicle, the particular type being characterized by at least one of:

a dashed line illumination pattern of the light, a measurement of a luminous intensity of the light being greater than a threshold luminous intensity, a color of the light being a specific color, or a light system having an ability to adjust the luminous intensity of the light in response to at least one of a measurement of an ambient lighting or a preference of the individual.

19. The method of claim 18, wherein the determining the location of the individual and the location of the vehicle associated with the individual comprises at least two of:

determining, based on information from a sensor, the location of the individual, determining, based on information from the communications device, the location of the individual, determining, based on the information from the sensor, the location of the vehicle associated with the individual, or determining, based on the information from the communications device, the location of the vehicle associated with the individual.

20. A non-transitory computer-readable medium for using a light of a parked vehicle to illuminate a path, the non-transitory computer-readable medium including instructions that, when executed by one or more processors, cause the one or more processors to:

determine a location of an individual and a location of a vehicle associated with the individual;

determine at least one path from the location of the individual to the location of the vehicle;

determine a path, of the at least one path, based at least in part on a value of a measurement of a safety criterion; and cause a light of a particular type of a parked vehicle to illuminate the path, the parked vehicle being different from the vehicle, the particular type being characterized by at least one of:

a dashed line illumination pattern of the light, a measurement of a luminous intensity of the light being greater than a threshold luminous intensity, a color of the light being a specific color, or a light system having an ability to adjust the luminous intensity of the light in response to at least one of a measurement of an ambient lighting or a preference of the individual.

* * * * *